Jan. 14, 1969   B. F. COHLAN   3,421,715
SPACE NAVIGATION SYSTEM
Filed July 8, 1966

INVENTOR.
BERNARD F. COHLAN
BY Elliott & Pastoriza
ATTORNEYS

United States Patent Office 3,421,715
Patented Jan. 14, 1969

3,421,715
SPACE NAVIGATION SYSTEM
Bernard F. Cohlan, 2850 Moraga Drive,
Los Angeles, Calif. 90024
Filed July 8, 1966, Ser. No. 563,800
U.S. Cl. 244—1      5 Claims
Int. Cl. B64c 39/02; H01s 3/00

ABSTRACT OF THE DISCLOSURE

A space navigation system wherein there is provided an evacuated enclosure in a space craft containing a central mass. This central mass is free floating and will thus follow a gravitational orbit. The enclosure includes sensing means for sensing any deviation of the position of the central mass from a given position and utilizing the signals developed as a consequence of such deviation for operating suitable propulsion units on the spacecraft so that the central mass will again be properly centered in the enclosure. Also included are force units for applying a force purposefully to the central mass to cause an intentional deviation thereof. This intentional deviation places the central mass in a new desired orbit in accordance with a desired navigational plan. The sensed changes in turn will then operate the propulsion units of the spacecraft to cause the craft to follow the new course.

---

Figure 1:
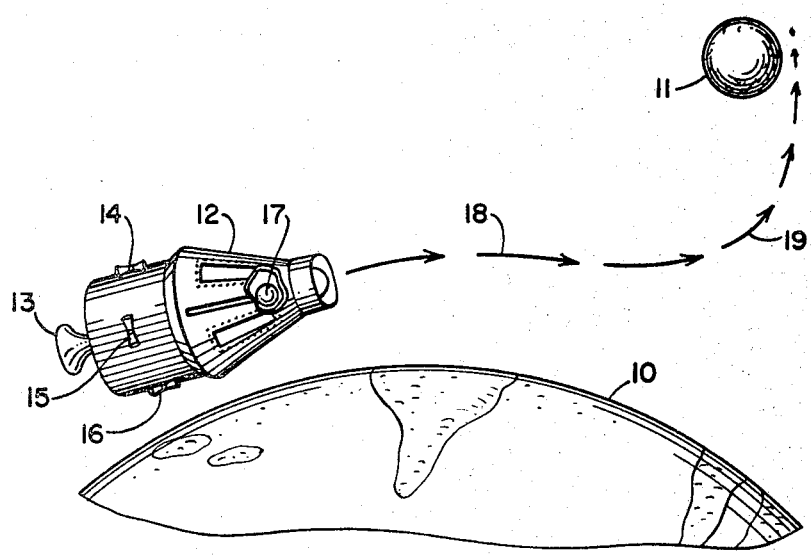

This invention relates generally to navigation systems for spacecrafts and more particularly to a novel method and apparatus for effecting desired changes in orbital paths followed by the spacecraft.

In my co-pending patent application Ser. No. 457,344 filed May 20, 1965 for Drag Free Space Spacecraft, there is described a spacecraft structure incorporating an outer body surrounding an inner body or central mass wherein this central mass is shielded by the outer body from substantially all drag forces and other environmental influences such that the central mass will describe a substantially true gravitational orbit. The outer body includes a sensing means for detecting any deviation of the central mass from an initial position as would result from drag forces acting on the exterior of the spacecraft. This sensing means provides control signals for operating suitable propulsion units on the spacecraft in such a manner as to cause the outer body to move relative to the central mass until the central mass assumes its initial position relative to the outer body. By such an arrangement, the spacecraft itself follows a substantially pure gravitational orbit and is thus referred to as a "drag free" spacecraft.

The primary object of the present invention is to provide a space navigation system which utilizes some of the principles set forth in my above referred to copending application.

More particularly, it is an object of the present invention to utilize a drag free spacecraft control system in which orbital changes may be effected in accord with input orbital parameters defining a new desired orbit and wherein the spacecraft involved will follow the new orbit without drag effects and the like so that essentially the basic computation need not take into account drag effects but can be computed purely on a mathematically defined gravitational orbit.

Briefly, these objects are realized by incorporating a central mass within a surrounding enclosure which shields the mass from all normal drag effects. This structure may constitute an integral part of a spacecraft or constitute a portion of a navigational apparatus mounted within the spacecraft. Once the spacecraft is in a given orbit, the central mass within the enclosure is released from a caged or supported position so that it will then follow a true gravitational orbital path corresponding to the given orbit. Any deviations of the position of the central mass relative to the enclosure are detected and signals are generated in accordance with such deviations for controlling the propulsion units of the spacecraft to move it at a speed and in a direction such as to recenter or cause the central mass to assume its original position relative to the enclosure. The spacecraft itself thus functions as a drag free spacecraft.

When it is desired to navigate to a new gravitational orbit, suitable means are activated for positively providing a force or forces on the inner central mass within the enclosure to effect a purposeful deviation thereof relative to the enclosure. This deviation is sensed in the manner of other deviations and the spacecraft is thus caused to travel in the new orbital path defined by the inner mass itself.

By means of the foregoing system for effecting an orbital change, there is only necessary to feed into the device parameters for describing the new gravitational orbit without having to take into account drag effects which normally occur in the computation of the desired new orbit.

Figure 2:
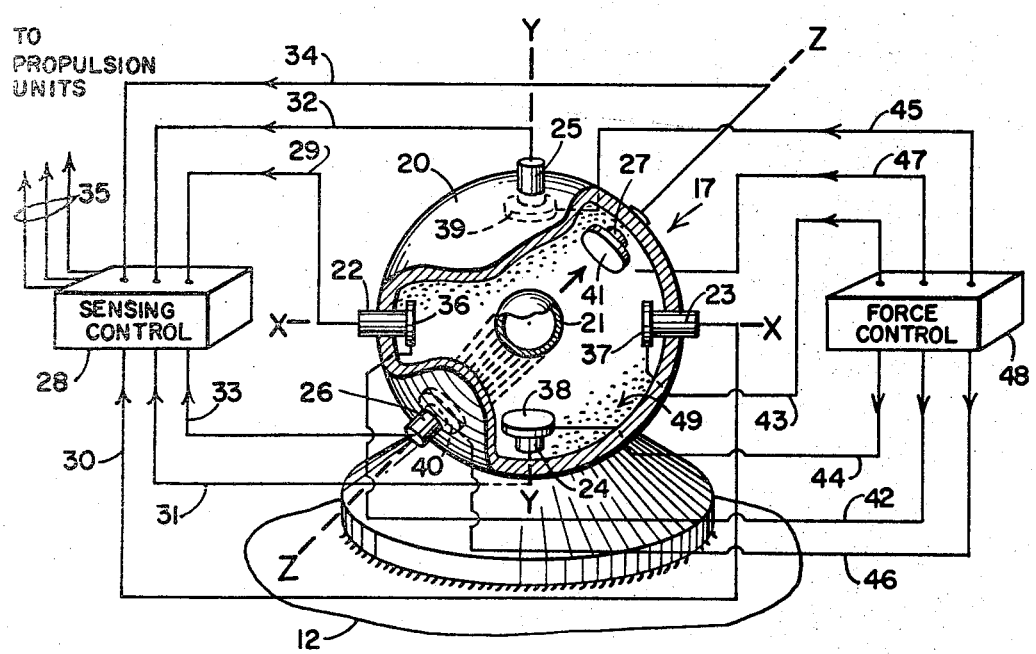

A better understanding of the invention will be had by now referring to one embodiment thereof as illustrated in the accompanying drawing, in which:

FIGURE 1 is a schematic perspective view illustrating a spacecraft in a given orbit with respect to a celestial body such as the earth; and FIGURE 2 is a perspective broken away view of one type of space navigating apparatus for carrying out navigational steps in altering the orbit of the spacecraft of FIGURE 1 to a new desired orbit.

Referring first to FIGURE 1 there is shown a planet such as the earth 10 and a neighboring celestial body such as a moon 11. A spacecraft 12 including suitable propulsion units such as a thrust propulsion unit 13 and various orientation or attitude control units such as 14, 15 and 16, is shown in orbit about the celestial body 10. A navigation system for the spacecraft 12 is shown at 17 mounted in the interior of the craft.

In the particular example set forth in FIGURE 1, the spacecraft 12 is shown in a given orbit defined by the dashed arrows 18. It is assumed for illustrating the one embodiment of the navigation system that it is desired to change this orbit 18 to a new gravitational orbit 19 towards the other celestial body 11. The manner in which the navigation system 17 effects this purposeful deviation in gravitational orbits will become clear by now referring to FIGURE 2.

In FIGURE 2, the navigational apparatus 17 includes an outer enclosure 20 preferably in the form of a hollow sphere. This enclosure is completely evacuated and includes in its interior a central mass in the form of a hollow or low density sphere 21. With the enclosure 20 securely mounted to the spacecraft 12, and with the spacecraft 12 in a gravitational orbit, the inner central mass 21 will follow this orbit free of any physical contact with the interior of the outer enclosure 20. To initially position the central mass 21, there may be provided suitable caging means or struts (not shown) which will hold the central mass 21 in a concentric position within the enclosure 20 until the spacecraft 12 is in a true gravitational orbit. At this time, the caging means is removed so that the mass 21 itself will follow this gravitational orbit.

The spacecraft 12 is caused to follow the same true gravitational orbit without any of the effects of drag by causing it to follow the inner central mass 21. This is achieved by suitable pairs of sensing units. Thus, a first pair is indicated at 22 and 23 disposed in diametrically opposite positions along a first orthogonal axis X—X; a second pair 24 and 25 positioned in diametrically opposite positions along an orthogonal axis Y—Y; and, a third pair 26 and 27 diametrically oppositely positioned along an orthogonal axis Z—Z. The axes X—X, Y—Y, and Z—Z, define an orthogonal rectangular coordinate system.

The sensing units as described are secured to the enclosure 20 and sense deviations of the position of the central mass 21 from its initial position which, in the illustration set forth, is concentric with the outer enclosing sphere 20. These sensing signals are passed from the pairs of sensing units to a sensing control 28, by way of leads 29, 30; 31, 32; and 33, 34, respectively. The sensing control 28 provides suitable control signals to output leads 35 arranged to energize the propulsion units 13, 14, 15, and 16 illustrated in FIGURE 1 on the spacecraft 12 and any other suitable propulsion units to change the speed and direction of the spacecraft in a manner such as to cause the central mass 21 to be recentered within the enclosure 20. When so recentered, the signals from the sensing control 28 cease so that the spacecraft essentially is slaved to the orbital movement of the central mass 21.

The structure described thus far is similar in principle to the drag free spacecraft described in my above-referred to co-pending application.

If now it is desired to change the orbital path of the spacecraft 12 to a new orbital path, a purposeful deviation of the inner mass 21 is effected. This deviation is carried out by means of force generating units which may correspond in position to the sensing units. Thus, the force generating units are schematically depicted as a first pair 36 and 37 at diametrically opposite positions along the X—X axis; 38 and 39 at diametrically opposite positions along the Y—Y axis; and 40 and 41 at diametrically opposite positions along the Z—Z axis. These pairs of positive force generating units are energized through suitable leads 42, 43; 44, 45; and 46, 47, respectively, connected to a force control computer 48.

The force control computer 48 provides signals to the various force generating units in accordance with the parameters of a new desired orbit in such a manner as to cause these force units to be energized to provide a given magnitude force for a given time duration on the central mass 21. It is most feasible to provide this force by means of electro-magnetic radiation such as a laser beam impinging upon the central mass. In this latter instance, it is desirable that the mass of the sphere 21 be small and yet the body itself have a relatively large cross sectional area for intercepting the laser beam. It is for this reason that the central mass is illustrated as a hollow sphere.

In addition, it is important that the force generated in the form of a laser beam act on the central mass 21 and that it constitute the major radiation force thereon. In other words, any radiation that might pass the mass 21 or be reflected from the mass 21 should be absorbed. Towards this end, it is preferable to provide the interior wall of the enclosure 20 with a light absorbing material or or anti-reflection coating such as indicated schematically at 49.

In the operation of the navigational apparatus as described in FIGURE 2, assume that the spacecraft 12 is in a given orbit so that the central mass 21 will follow this given orbit. As described heretofore, the spacecraft 12 has its propulsion units operated in accordance with any deviation of the central mass 21 from its concentric position with the enclosure 20 through the medium of the sensing units such that the spacecraft 12 itself will follow the given gravitation orbit with the central mass 21.

If it is now desired to change this orbit to a new orbit, suitable parameters defining the new orbit are fed into the force control computer 48 which in turn will pass output signals along the various leads connecting to the various force units in such a manner as to energize certain ones of the units to positively move the central mass 21 relative to the enclosure 20 in a path defining the new orbit.

For example, if it is assumed that the orbit 18 is to be changed to the new orbit 19 of FIGURE 1, the force generating unit 40 would be energized through the lead 46 from the force control computer 48 to irradiate the sphere 21 with a laser beam. This irradiation is schematically depicted by the dashed lines from the force generating unit 40. The impingement of the radiation on the sphere 21 will cause it to move along the Z axis towards the sensing unit 27 and this deviation will thus be detected by the sensing unit and through the lead 34 cause a control signal to be generated in the sensing control 28. This control signal will be passed through one of the leads 35 to suitable propulsion units to cause the spacecraft itself to move in the direction of the Z axis in an attempt to recenter the central mass 21. When the central mass 21 is recentered to its initial position, the signal from the sensing unit 27 will cease so that the propulsion units will then be turned off. The degree of deviation of the central mass 21 by the laser beam will depend upon the magnitude of the beam and the duration of time that the beam acts on the mass 21. This magnitude and length of time is under control of the force control computer 48 and is provided in accord with the input parameters defining the new orbit.

It will of course be understood that orbital paths different from those following one of the orthogonal axes can be effected by operating two or more of the force generating units simultaneously so that the particular new direction or deviation of the central mass 21 may be intermediate along two of the orthogonal axes.

From the foregoing description, it will thus be evident that the present invention has provided a novel method and apparatus for navigating spacecraft wherein the spacecraft itself will follow precisely mathematically defined gravitational orbits and considerations of drag and other forces acting on the spacecraft can be neglected.

What is claimed is:

1. A space navigation system for navigating a spacecraft having controllable propulsion units for changing its direction and speed, comprising, in combination: enclosure means secured to said spacecraft and defining a vacuum environment; a central mass within said enclosure means and free of any physical contact with said enclosure means such that said mass follows a given orbit; sensing means for providing propulsion unit control signals in response to deviations of said central mass from its initial position relative to said enclosure means to energize said propulsion units and change the direction and speed of said spacecraft in a manner such that said central mass assumes its initial position relative to said enclosure means; and force generating means for providing a force of given magnitude for a given time duration to said central mass to effect a desired deviation thereof to a new orbit whereby said spacecraft is caused to travel in said new orbit.

2. A system according to claim 1, in which said force generating means includes means for generating a high intensity beam of electro-magnetic radiation for irradiating said central mass.

3. A system according to claim 1, in which said sensing means includes three pairs of sensing units, each pair being diametrically mounted on said enclosure means along three orthogonal axes respectively, said force generating means including three pairs of electro-magnetic radiation emitting units, each pair being diametrically mounted on said enclosure means along three orthogonal axes respectively and positioned to direct their radiation in a beam along their respective axes towards said central mass.

4. A system according to claim 3, including sensing control means connected between said sensing units and said propulsion units for energizing said propulsion units in accordance with said control signals; and force control means connected to said electro-magnetic radiation emitting units for energizing the same to provide given intensity beams for given lengths of time in accord with parameters defining said new orbit.

5. A system according to claim 4, in which said central mass is in the form of a hollow sphere, the interior wall of said enclosure including means inhibiting reflection therefrom of any of said electro-magnetic radiation passing and reflected from said sphere.

References Cited

UNITED STATES PATENTS

| 3,073,550 | 1/1963 | Young | 244—3.2 X |
| 3,135,479 | 6/1964 | Badewitz | 244—1 |
| 2,233,848 | 2/1966 | Byrne | 244—3.14 |

FERGUS S. MIDDLETON, *Primary Examiner.*

U.S. Cl. X.R.

331—94.5